(12) United States Patent
Kawana et al.

(10) Patent No.: US 9,854,220 B2
(45) Date of Patent: Dec. 26, 2017

(54) INFORMATION PROCESSING APPARATUS, PROGRAM, AND INFORMATION PROCESSING METHOD

(71) Applicant: Saturn Licensing LLC, New York, NY (US)

(72) Inventors: Koichi Kawana, Chiba (JP); Noboru Murabayashi, Saitama (JP)

(73) Assignee: Saturn Licensing LLC, New York, NY (US)

(*) Notice: Subject to any disclaimer, the term of this patent is extended or adjusted under 35 U.S.C. 154(b) by 0 days.

(21) Appl. No.: 13/875,527

(22) Filed: May 2, 2013

(65) Prior Publication Data

US 2013/0322849 A1 Dec. 5, 2013

(30) Foreign Application Priority Data

May 31, 2012 (JP) ................. 2012-124314

(51) Int. Cl.
*H04N 9/80* (2006.01)
*H04N 9/87* (2006.01)
(Continued)

(52) U.S. Cl.
CPC ............. *H04N 9/87* (2013.01); *H04N 5/91* (2013.01); *H04N 9/7921* (2013.01);
(Continued)

(58) Field of Classification Search
CPC ........ H04N 5/765; H04N 5/91; H04N 9/7921; H04N 21/44016; H04N 9/87; H04N 21/4325; H04N 9/8205
(Continued)

(56) References Cited

U.S. PATENT DOCUMENTS 8,374,975 B1* 2/2013 Cierniak et al. ................ 706/12
8,612,208 B2* 12/2013 Cooper et al. .................... 704/9
(Continued)

FOREIGN PATENT DOCUMENTS

CN 101174407 A 5/2008
CN 101414302 A 10/2008
(Continued)

OTHER PUBLICATIONS

English Translation of WIPO Publication 2010-061538 Jun. 2010.*
(Continued)

*Primary Examiner* — William Tran
(74) *Attorney, Agent, or Firm* — Oblon, McClelland, Maier & Neustadt, L.L.P.

(57) ABSTRACT

An information processing apparatus includes a content reproduction unit, a content part specification unit, a clustering unit, a class detection unit, a common class extraction unit, and a content retrieval unit. The content reproduction unit is configured to reproduce a reproduction content. The content part specification unit is configured to specify a plurality of content parts included in the reproduction content. The clustering unit is configured to classify the plurality of content parts into a plurality of clusters. The class detection unit is configured to detect a class from the plurality of content parts included in each of the plurality of clusters. The common class extraction unit is configured to extract a common class common to the plurality of clusters from the classes detected by the class detection unit. The content retrieval unit is configured to retrieve a content corresponding to the common class.

9 Claims, 6 Drawing Sheets

(51) Int. Cl.
  *H04N 5/91* (2006.01)
  *H04N 9/79* (2006.01)
  *H04N 9/82* (2006.01)
  *H04N 21/432* (2011.01)
  *H04N 21/44* (2011.01)
  *H04N 5/765* (2006.01)

(52) U.S. Cl.
  CPC ....... *H04N 9/8205* (2013.01); *H04N 21/4325* (2013.01); *H04N 21/44016* (2013.01); *H04N 5/765* (2013.01)

(58) Field of Classification Search
  USPC .................................................. 386/241, 248
  See application file for complete search history.

(56) References Cited

U.S. PATENT DOCUMENTS

| | | | | |
|---|---|---|---|---|
| 8,732,197 B2* | 5/2014 | Musgrove | ......... | G06F 17/30731 707/776 |
| 2005/0182764 A1* | 8/2005 | Evans | ................................ | 707/5 |
| 2007/0208990 A1* | 9/2007 | Kim | .................. | G06F 17/30749 715/203 |
| 2008/0154875 A1* | 6/2008 | Morscher et al. | ................. | 707/5 |
| 2009/0037389 A1* | 2/2009 | Kothari et al. | .................... | 707/3 |
| 2009/0080853 A1* | 3/2009 | Chen | ................. | G06F 17/30787 386/241 |
| 2011/0191716 A1 | 8/2011 | Sakamoto et al. | | |
| 2011/0221927 A1* | 9/2011 | Takagi | ....................... | 348/222.1 |
| 2012/0057775 A1* | 3/2012 | Suzuki et al. | ................. | 382/154 |
| 2012/0076357 A1* | 3/2012 | Yamamoto et al. | .......... | 382/103 |
| 2013/0108241 A1* | 5/2013 | Miyamoto et al. | ........... | 386/241 |

FOREIGN PATENT DOCUMENTS

| | | |
|---|---|---|
| CN | 101521655 A | 9/2009 |
| JP | 2005-107885 | 4/2005 |
| JP | 2012-79187 | 4/2012 |
| WO | 2010/027034 A1 | 3/2010 |
| WO | 2010/061538 A1 | 6/2010 |

OTHER PUBLICATIONS

Office Action mailed May 10, 2016 in Japanese Patent Application No. 2012-124314 (with English Translation).

Office Action issued in Chinese patent Application No. 201310196332.7 dated Jun. 1, 2017 with English Translation.

* cited by examiner

FIG.5A
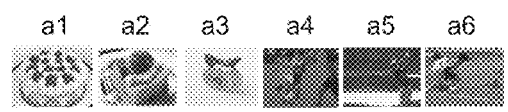
FIG.5B
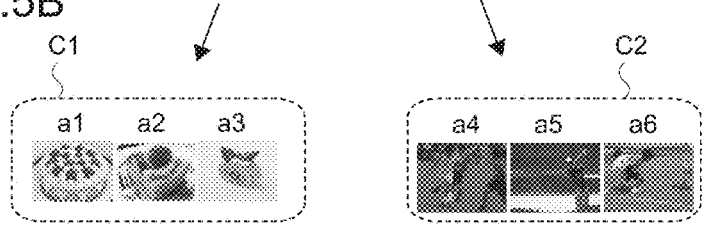
FIG.5C
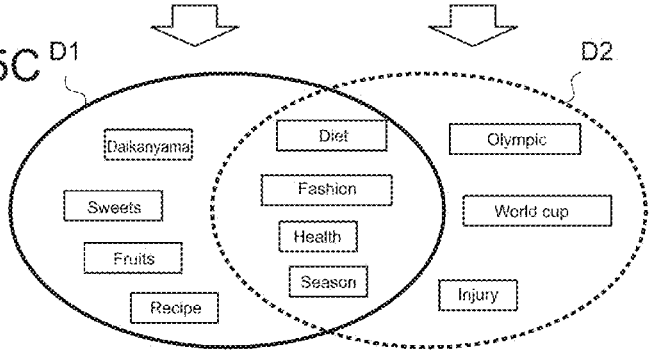
FIG.5D
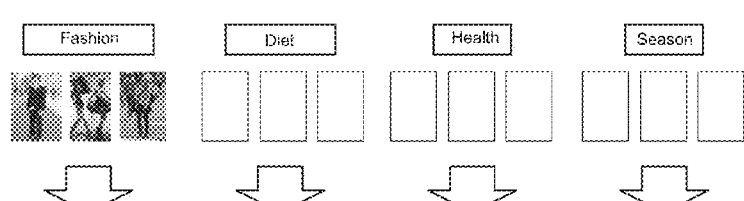
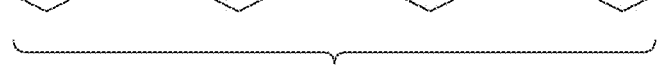
Content presentation

INFORMATION PROCESSING APPARATUS, PROGRAM, AND INFORMATION PROCESSING METHOD

BACKGROUND

The present disclosure relates to an information processing apparatus, a program, and an information processing method for presenting a reproduction content to a user.

With the spread of recording and reproducing apparatuses, the Internet, and the like, the amount of contents usable by a user is increasing, and it is necessary for a user to select a content that meets the taste of the user from among huge amounts of contents. These days, there is a technique for retrieving a content related to contents reproduced or recorded by a user and presenting the content to the user.

For example, International Publication WO2010/027034 discloses a content recommendation system that presents a content in accordance with the taste of a user. The system grasps the taste of a user on the basis of information obtained from contents that have been reproduced and presents to the user a content that coincides with the taste of the user.

SUMMARY

However, in the system disclosed in International Publication WO2010/027034, the information as a reference of a content to be recommended is obtained from the contents that have been reproduced, so the range of contents to be recommended is limited to a specific category or the like.

In view of the above-mentioned circumstances, it is desirable to provide an information processing apparatus, a program, and an information processing method capable of presenting various contents that coincide with a potential taste of a user.

According to an embodiment of the present disclosure, there is provided an information processing apparatus including a content reproduction unit, a content part specification unit, a clustering unit, a class detection unit, a common class extraction unit, and a content retrieval unit.

The content reproduction unit is configured to reproduce a reproduction content.

The content part specification unit is configured to specify a plurality of content parts included in the reproduction content.

The clustering unit is configured to classify the plurality of content parts into a plurality of clusters.

The class detection unit is configured to detect a class from the plurality of content parts included in each of the plurality of clusters.

The common class extraction unit is configured to extract a common class common to the plurality of clusters from the classes detected by the class detection unit.

The content retrieval unit is configured to retrieve a content corresponding to the common class.

With this structure, the information processing apparatus retrieves a content corresponding to the class common to the plurality of clusters from among the classes (concepts) detected from the classified content parts (e.g., a scene of a moving image content) classified into the plurality of clusters, and therefore it is possible to present a new content to a user while reflecting a user's taste.

The content part specification unit may specify the plurality of content parts in response to specification by a user.

With this structure, it is possible for the information processing apparatus to extract the common class on the basis of the content part specified (registered as a favorite, for example) by the user.

The content part specification unit may specify the plurality of content parts on the basis of a feature amount extracted from the reproduction content.

With this structure, it is possible for the information processing apparatus to specify an important scene (exciting scene, for example) of the reproduction content as the content part and extract the common class from the content part.

The class detection unit may perform an ontology process for the plurality of content parts included in each of the plurality of clusters to detect the class from the plurality of content parts.

With this structure, it is possible for the information processing apparatus to widely detect the class common to the plurality of content parts included in the clusters, that is, extract a larger number of common classes.

The clustering unit may classify the plurality of content parts into the plurality of clusters on the basis of feature amounts detected from the plurality of content parts.

With this structure, it is possible for the information processing apparatus to recognize an object included in the content parts and performs the clustering for the content parts in accordance with the object by checking the feature amounts detected from the content parts against a database.

The content part specification unit may specify the plurality of content parts on the basis of an image feature amount extracted from the reproduction content.

With this structure, it is possible for the information processing apparatus to obtain a motion of a camera that has shot the reproduction content from an image feature amount extracted from the reproduction content, e.g., a motion vector of the image, and specify the important scene of the reproduction content as the content part.

The content part specification unit may specify the plurality of content parts on the basis of an audio feature amount extracted from the reproduction content.

With this structure, it is possible for the information processing apparatus to obtain a peak of the audio from the audio feature amount extracted from the reproduction content, for example, an audio power spectrum, and specify the important scene of the reproduction content as the content part.

The content reproduction unit may reflect the common class on reproduction of the reproduction content.

With this structure, it is possible for the information processing apparatus to present to the user the content part corresponding to the common class extracted as a recommended scene, and thus the user can reproduce only the recommended scene, for example.

According to another embodiment of the present disclosure, there is provided a program causing an information processing apparatus to function as a content reproduction unit, a content part specification unit, a clustering unit, a class detection unit, a common class extraction unit, and a content retrieval unit.

The content reproduction unit is configured to reproduce a reproduction content.

The content part specification unit is configured to specify a plurality of content parts included in the reproduction content.

The clustering unit is configured to classify the plurality of content parts into a plurality of clusters.

The class detection unit is configured to detect a class from the plurality of content parts included in each of the plurality of clusters.

The common class extraction unit is configured to extract a common class common to the plurality of clusters from the classes detected by the class detection unit.

The content retrieval unit is configured to retrieve a content corresponding to the common class.

According to another embodiment of the present disclosure, there is provided an information processing method.

In the information processing method, a content reproduction unit reproduces a reproduction content.

A content part specification unit specifies a plurality of content parts included in the reproduction content.

A clustering unit classifies the plurality of content parts into a plurality of clusters.

A class detection unit detects a class from the plurality of content parts included in each of the plurality of clusters.

A common class extraction unit extracts a common class common to the plurality of clusters from the classes detected by the class detection unit.

A content retrieval unit retrieves a content corresponding to the common class.

As described above, according to the embodiments of the present disclosure, it is possible to provide the information processing apparatus, the program, and the information processing method capable of presenting to the user various contents that coincide with the potential taste of the user.

These and other objects, features and advantages of the present disclosure will become more apparent in light of the following detailed description of best mode embodiments thereof, as illustrated in the accompanying drawings.

BRIEF DESCRIPTION OF DRAWINGS

FIGS. 5A to 5D are schematic diagrams showing the operation of the information processing apparatus.

DETAILED DESCRIPTION OF EMBODIMENTS

Figure 1:
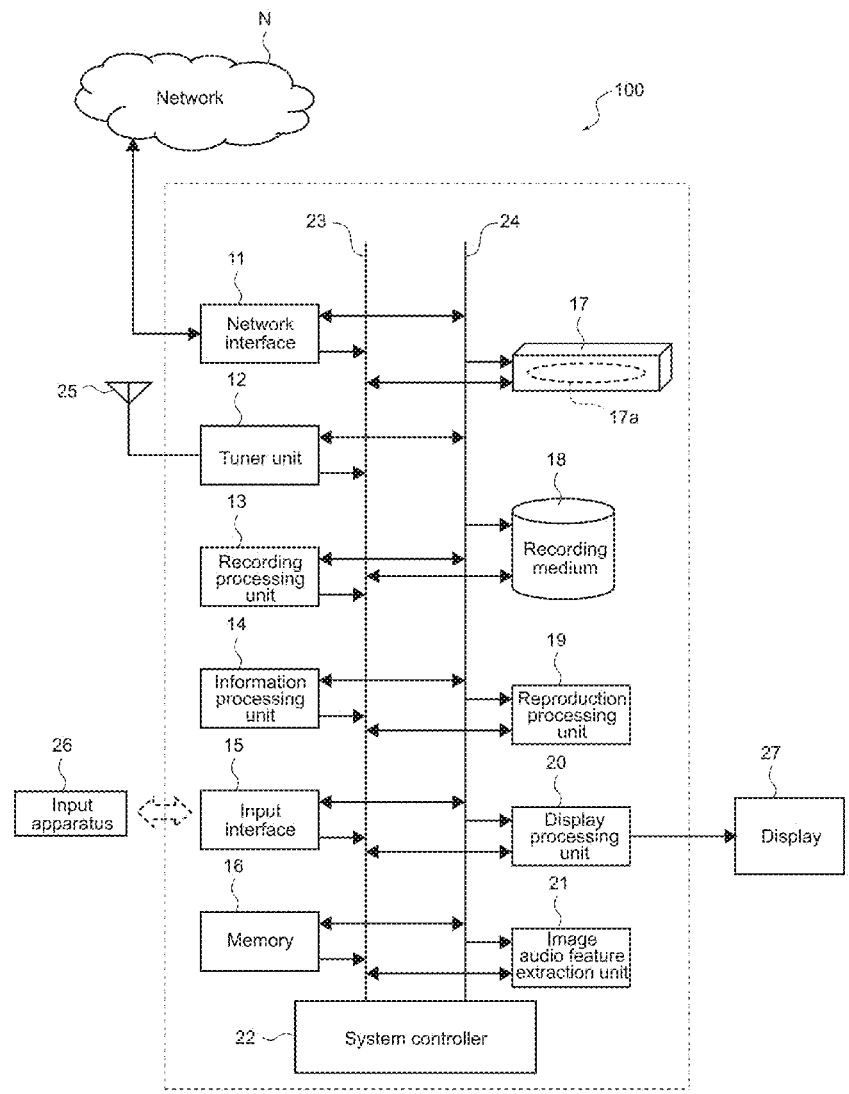
FIG. 1 is a schematic diagram showing the structure of an information processing apparatus according to an embodiment of the present disclosure.

An information processing apparatus according to an embodiment of the present disclosure will be described. FIG. 1 is a block diagram showing the structure of an information processing apparatus 100. The information processing apparatus 100 can be a recording and reproducing apparatus (for example, an HDD (hard disc drive) recorder, a BD (Blu-ray disc (registered trademark), or the like) capable of recording and reproducing a moving image content but is not limited to this.

As shown in the figure, the information processing apparatus 100 includes a network interface (IF) 11, a tuner unit 12, a recording processing unit 13, an information processing unit 14, an input interface 15, a memory 16, a disc drive 17, a recording medium 18, a reproduction processing unit 19, a display processing unit 20, an image audio feature extraction unit 21, a system controller 22, a data bus 23, and a control bus 24.

The network interface 11, the tuner unit 12, the recording processing unit 13, the information processing unit 14, and the input interface 15, the memory 16, the disc drive 17, the recording medium 18, the reproduction processing unit 19, the display processing unit 20, the image audio feature extraction unit 21, and the system controller 22 are connected to the data bus 23 and the control bus 24. The network interface 11 is connected to a network (the Internet, for example) N, and to the tuner unit 12, an antenna 25 is connected. To the input interface 15, an input apparatus (a remote controller, a keyboard, a mouse, or the like) 26 is connected, and to the display processing unit 20, a display 27 is connected.

The network interface 11 transmits and receives information to and from the network N. The tuner unit 12 receives broadcast waves via the antenna 25 and generates a video signal. The recording processing unit 13 executes recording processing for the video signal generated by the tuner unit 12. The information processing unit 14 performs, for example, processing of estimating an attribute of a content to be described later. The input interface 15 receives an input signal generated in the input apparatus 26 in response to a user's operation.

A program or the like that is processed in the information processing unit 14 is written in or read from the memory. The disc drive 17 reads information recorded in a disc-shaped recording medium 17a, such as a content, or records information in the disc-shaped recording medium 17a. The recording medium 18 stores programs or contents. The reproduction processing unit 19 performs reproduction processing for a content stored in the disc drive 17 or the recording medium 18.

The display processing unit 20 generates a video signal from a content reproduced by the reproduction processing unit 19 and supplies the signal to the display 27. The image audio feature extraction unit 21 extracts feature amounts (to be described later) of an image and/or an audio from a content reproduced and supplies the feature amount to the information processing unit 14. The system controller 22 controls the transmission and reception of various signals by the units via the data bus 23 and the control bus 24. It should be noted that predetermined processing in the information processing unit 14 can be performed by a predetermined server or the like (not shown in FIG. 1) connected via the network N.

The information processing apparatus 100 can have the structure described above. It should be noted that the structure of the information processing apparatus 100 is not limited to the structure described above and can be changed as appropriate. The information processing apparatus 100 implements the following functional structure by the hardware structure described above and software read therein in cooperation with each other.

Figure 2:
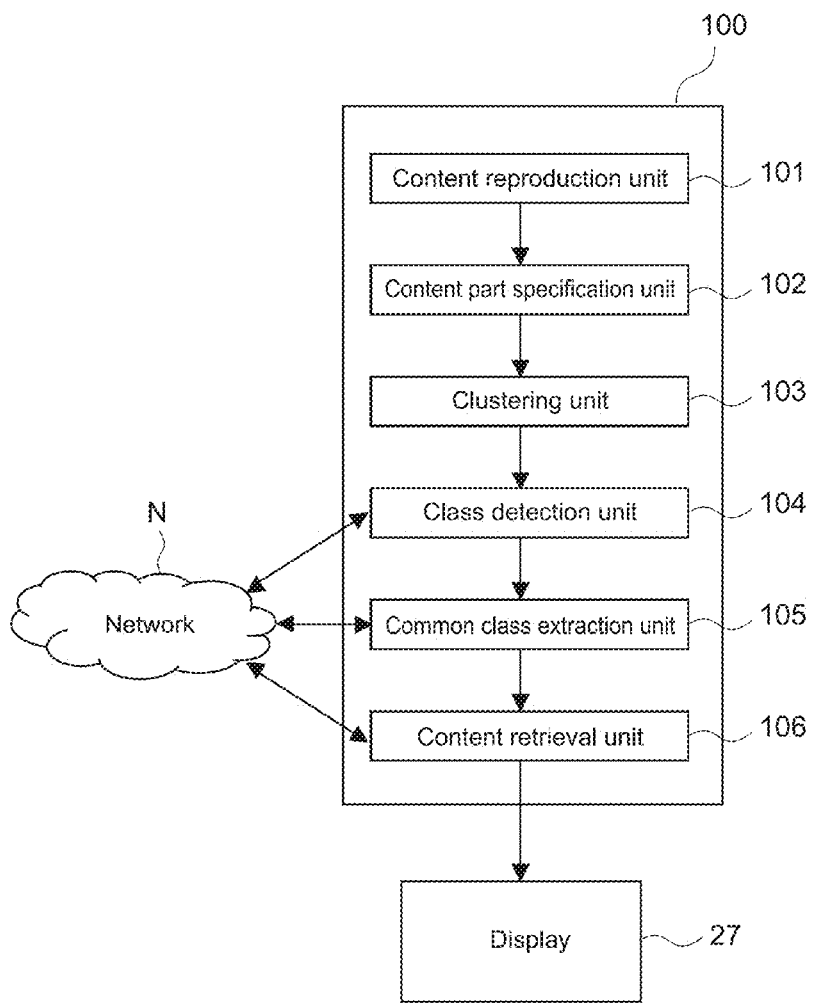
FIG. 2 is a schematic diagram showing the functional structure of the information processing apparatus.

FIG. 2 is a block diagram showing the functional structure of the information processing apparatus 100, and FIGS. 3A to 3E are schematic diagrams for explaining the functional structure of the information processing apparatus 100. As shown in FIG. 2, the information processing apparatus 100 has, as the functional structure, a content reproduction unit 101, a content partial specification unit 102, a clustering unit 103, a class detection unit 104, a common class extraction unit 105, and a content retrieval unit 106. Those units are connected to each other, and the content retrieval unit 106 is connected to the network N and the display 27.

Figure 3:
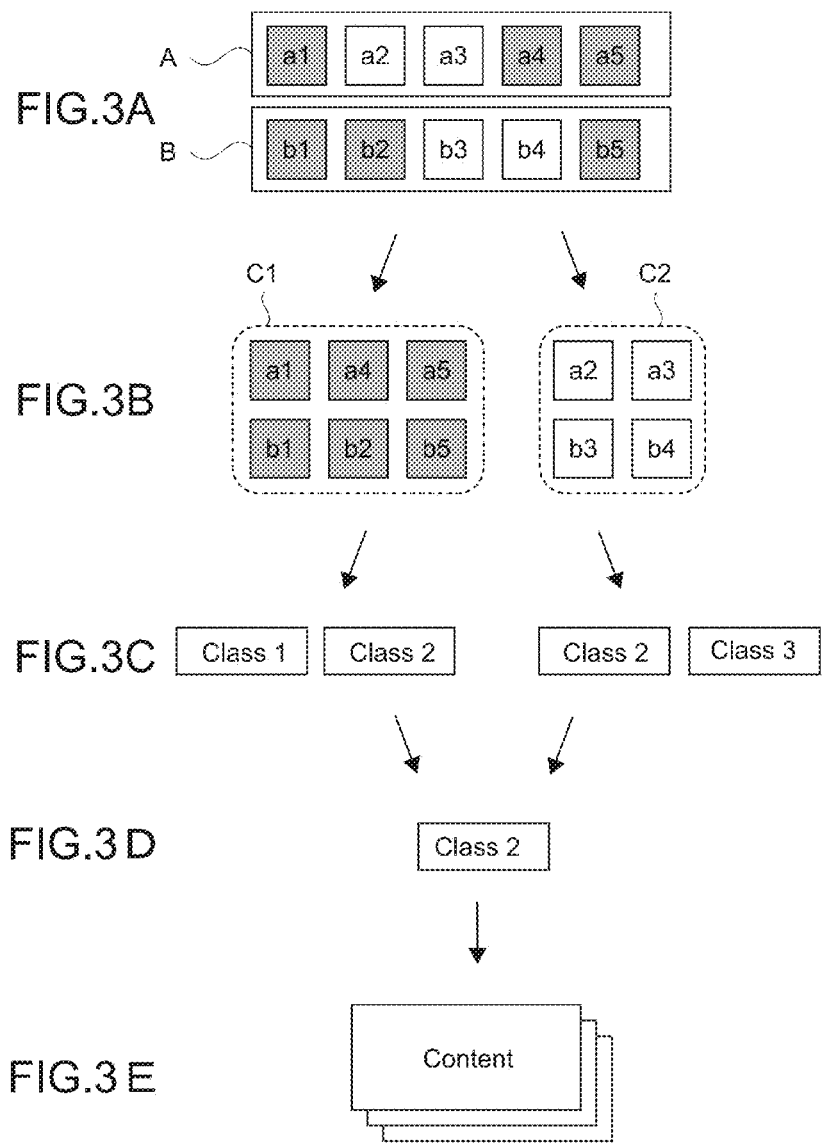
FIGS. 3A to 3E are schematic diagrams for explaining the functional structure of the information processing apparatus.

The content reproduction unit 101 reproduces a content (hereinafter, referred to as reproduction content). The reproduction contents include various contents such as moving image contents and audio contents. The content reproduction unit 101 can reproduce a content read from the recording medium 18 as the reproduction content. FIG. 3A shows a reproduction content A reproduced by a user A and a reproduction content B reproduced by a user 2. It should be noted that the number of reproduction contents may be two or more.

The reproduction content includes a plurality of content parts. The content part is a part of the reproduction content and typically is a scene of a moving image content. The reproduction content A shown in FIG. 3A includes content parts a1, a2, a3, a4, and a5, and the reproduction content B includes content parts b1, b2, b3, b4, and b5.

The content part specification unit 102 specifies a content part in each of the reproduction content A and the reproduction content B. The content part specification unit 102 can specify a content part specified (registered as a favorite, for example) by a user or can specify a content part detected by the content part specification unit 102 by a method to be described later. As shown in FIG. 3A, the assumption is made that the content part specification unit 102 specifies the content parts a1 to a5 for the content A and the content parts b1 to b5 for the content B. The content part specification unit 102 supplies the plurality of content parts specified to the clustering unit 103.

The clustering unit 103 classifies the content parts supplied from the content part specification unit 102 into a plurality of clusters on the basis of the feature amount included in each of the content parts. The clustering unit 103 uses the feature amounts (motion vector, color feature amount, luminance feature amount, edge feature amount, or the like) of the images of the content parts or the feature amounts (feature amounts of audio power spectrum of a predetermined frequency band, average audio level in a predetermined section, or the like) of the audio of the content parts, and thus can cluster the content parts. FIG. 3B shows a cluster C1 and a cluster C2, which are obtained by clustering the content parts by the clustering unit 103. It should be noted that the clustering unit 103 can perform the clustering to make two or more clusters of the content parts. The clustering unit 103 supplies the content parts for each cluster to the class detection unit 104.

The class detection unit 104 detects a "class" from the content parts included in the clusters. The class refers to a concept that can be commonly extracted from the content parts. FIG. 3C shows classes detected for each cluster. Here, from the cluster C1, a class 1 and a class 2 are detected, and from the cluster C2, a class 2 and a class 3 are detected. The class detection unit 104 performs an "ontology process (concept classification process)" with the use of the feature amounts of the content parts included in the clusters, and thus can detect the classes of the clusters. The class detection unit 104 supplies the classes detected for the respective clusters to the common class extraction unit 105.

The common class extraction unit 105 extracts a class common to the plurality of clusters (hereinafter, referred to as common class). FIG. 3D shows a common class (class 2 in this case) extracted. It should be noted that the common class extraction unit 105 can extract a common class from classes of a plurality of users via the network N. The common class extraction unit 105 supplies the common class extracted to the content retrieval unit 106.

The content retrieval unit 106 retrieves a content corresponding to the common class. FIG. 3E shows contents obtained by the content retrieval unit 106. On the basis of the feature amounts of each common class, the content retrieval unit 106 can retrieve one or more contents corresponding to the common class from among the contents on the network N or the contents recorded in the information processing apparatus 100.

It should be noted that the contents that are retrieved by the content retrieval unit 106 are not limited to the moving image contents and may be still image or audio contents or text contents. The content retrieval unit 106 can download the content retrieved or read the content from the recording medium, and displays the content on the display 27 or the like, thereby making it possible to present the content to the user. Here, the units 103 to 106 shown in FIG. 2 can be implemented by a predetermined server (not shown in FIG. 2) connected thereto via the network N. In this case, data output from the content part specification unit 102 shown in FIG. 2 is input to the predetermined server (not shown in FIG. 2) connected via the network N, and predetermined processing can be performed.

(Operation of Information Processing Apparatus)

Figure 4:
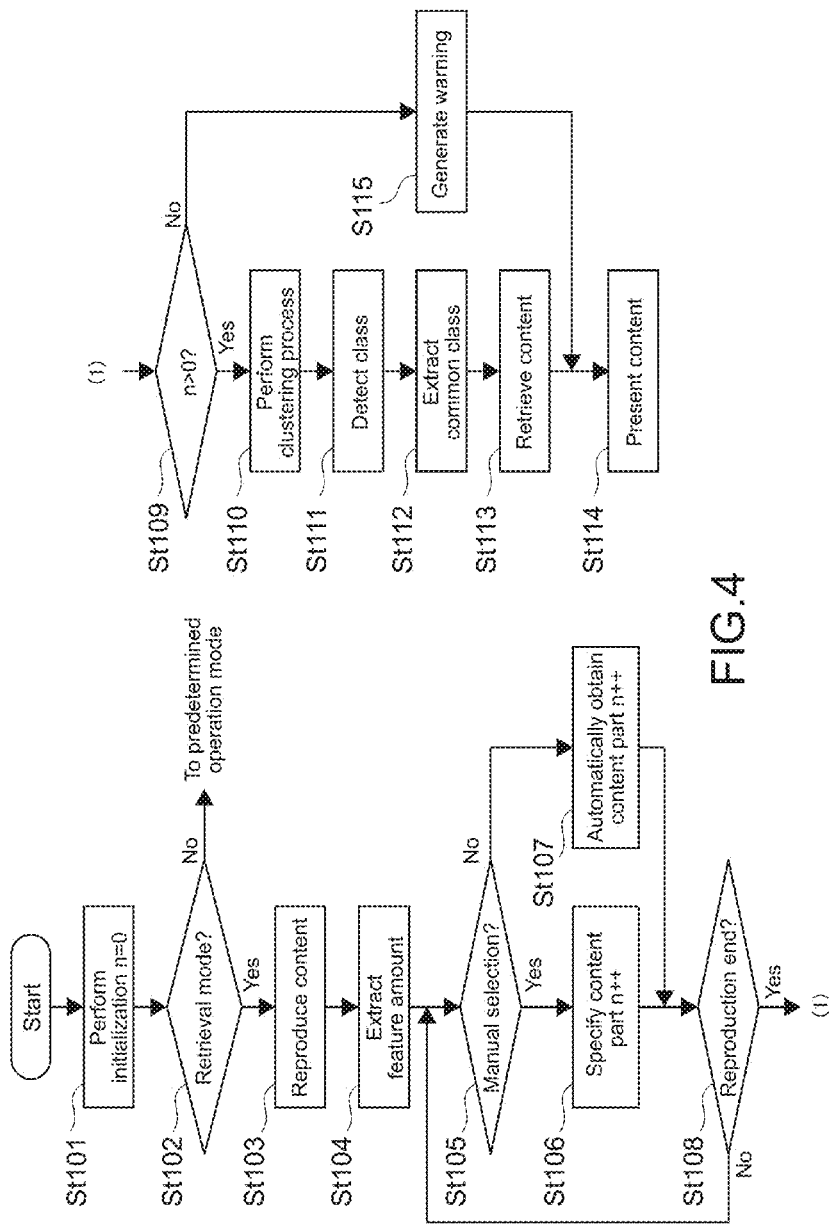
FIG. 4 is a flowchart showing the operation of the information processing apparatus.

The operation of the information processing apparatus 100 will be described. FIG. 4 is a flowchart showing the operation of the information processing apparatus 100, and FIGS. 5A to 5D are schematic diagrams showing the operation of the information processing apparatus 100.

First, the content part specification unit 102 initializes a counter (n=0) (St101). The counter indicates the number of content parts specified by the content part specification unit 102 and is used in steps to be described later.

Subsequently, the information processing apparatus 100 confirms whether a user gives an instruction to use a retrieval mode according to the present disclosure or not (St102). In the case where the instruction to use the retrieval mode according to the present disclosure is not given (No in St102), the information processing apparatus 100 shifts to an operation mode indicated. In the case where the instruction to use the retrieval mode according to the present disclosure is given (Yes in St102), the content reproduction unit 101 reproduces a content selected by the user (St103).

Subsequently, the image audio feature extraction unit 21 performs feature amount execution processing for the content reproduced (St104). The image audio feature extraction unit 21 can extract one or both of the image feature amount and the audio feature amount from the content.

Subsequently, the user selects whether the content part is manually specified or automatically specified (St105). In the case where the manual specification of the content part is selected (Yes in St105), the user specifies the content part (St106). The user can use a remote controller or predetermined cursor means or directly touch a touch panel when the touch panel is used, thereby specifying the content part.

The content part specification unit 102 specifies a content part (for example, scene registered as a favorite by the user) specified by the user. At the time when the content part is specified, the content part specification unit 102 adds the counter ($n^{++}$) in accordance with the number of content parts specified.

Further, in the case where the automatic specification of the content part is selected (No in St105), the content part specification unit 102 specifies the content part on the basis of the feature amount of the content extracted by the image audio feature extraction unit 21 (St107). Although the details will be described later, the content part specification unit 102 specifies an important scene (exciting scene, for example) in the content from the feature amount (for example, a motion vector in a predetermined section, an image feature amount such as a color feature amount and a luminance feature amount, or an audio feature amount such as an audio power spectrum and an average audio level in a predetermined section) of the content, and can specify the scene as the content part. FIG. 5A shows content parts a1 to a6 specified by the content part specification unit 102.

Then, in the case where the reproduction of the content is terminated (Yes in St108), the information processing apparatus 100 checks the counter (St109). On the other hand, in the case where the reproduction of the content is not terminated (No in St108), the process returns to the selection of the method of specifying the content part (St105).

Subsequently, in the case where a counter value is 1 or more (Yes in St109), the clustering unit 103 performs the clustering (St110). The clustering unit 103 checks the feature amount of the content parts extracted by the image audio feature extraction unit 21 against the database, and thus can recognize an object included in the content parts. In the case of a moving image content, the recognition of the object can be performed with the use of a predetermined image feature amount in each segmentation area after frame images are subjected to an image segmentation process. In the case of a still image, the same process can be performed for each image. Subsequently, the clustering unit 103 classifies the content parts in accordance with the object recognized (clustering). FIG. 5B shows an example of the content parts that have been subjected to the clustering. As shown in FIG. 5B, the clustering is performed so that the content parts a1 to a3 are as the cluster C1 and the content parts a4 to a6 are as the cluster C2. It should be noted that in the case where the counter value is 0 (No in St109), it may be impossible to perform the clustering, so the information processing apparatus 100 generates a warning indicating that the retrieval according to the present disclosure is difficult to be performed (St115).

The clustering unit 103 is capable of performing clustering by a known clustering process such as a k-mean method and a fuzzy c-mean method. Further, the clustering unit 103 is also capable of classifying the content parts into predetermined classes processed in advance on a database on the basis of a machine learning technique. As the machine learning technique, a neutral network and an SVM (support vector machine) are known. Here, in the processes of FIGS. 5A and 5B, the clustering process is performed first on the basis of the feature amounts, and after that, the object recognition process is performed for each class that has been subjected to the clustering process. In this case, it is also possible to perform the recognition process for each data of the contents of the classes on the basis of a predetermined feature amount, a majority decision process for the result obtained, and a recognition determination process. In addition, it is also possible to perform the recognition process on the basis of average data of the predetermined feature amounts of the contents of the classes.

Subsequently, the class detection unit 104 detects a class of the clusters by the ontology process using the feature amounts of the content parts included in the respective clusters (Still). For example, as shown in FIG. 5C, in the case where the content part included in the cluster C1 is a scene of a "cake", the class detection unit 104 detects a class relating to the "cake" by the ontology process. In this case, the class detection unit 104 detects the classes of "sweets", "Daikanyama", "fruits", "recipe", "diet", "fashion", "health", and "season". Hereinafter, those classes are collectively referred to as a detection class D1.

In the same way, in the case where the content part included in the cluster C2 is a scene of "sports", the class detection unit 104 detects a class relating to the "sports" by the ontology process. In this case, the class detection unit 104 detects the classes of "Olympic", "world cup", "injury", "diet", "fashion", "health", and "season". Hereinafter, those classes are collectively referred to as a detection class D2.

Subsequently, the common class extraction unit 105 extracts a class (common class) common to the detection class D1 and the detection class D2 (St112). In FIG. 5C, the "diet", the "fashion", the "health", and the "season" are the common class included in the detection class D1 and the detection class D2.

Subsequently, the content retrieval unit 106 retrieves a content corresponding to the common class (St113). As shown in FIG. 5D, for example, the content retrieval unit 106 retrieves the common class as a retrieval keyword, or can retrieves one coincident with the common class from meta information (EPG: electronic program guide or the like) given to the contents.

Subsequently, the information processing apparatus 100 presents to a user the content retrieved by the content retrieval unit 106 (St114). The information processing apparatus 100 can present to the user the content by displaying the content on the display 27 or the like. Further, the information processing apparatus 100 can also present to the user the common class extracted by the common class extraction unit 105 as a keyword, in addition to the content retrieved by the content retrieval unit 106.

As described above, the information processing apparatus 100 according to this embodiment retrieves a content corresponding to the class common to the plurality of content parts extracted from reproduction contents or specified by the user. Therefore, the information processing apparatus 100 can retrieve a content which the user is potentially interested in and present the content to the user.

(Regarding Feature Amount Extraction)

As described above, in the case where the automatic specification of the content part is selected (No in St105), the content part specification unit 102 specifies a content part on the basis of the feature amounts of reproduction contents (St107). The content part specification unit 102 uses the feature amount of the reproduction content to detect an important scene (exciting scene) in the reproduction content, and can specify the detected important scene as the content part.

Figure 6:
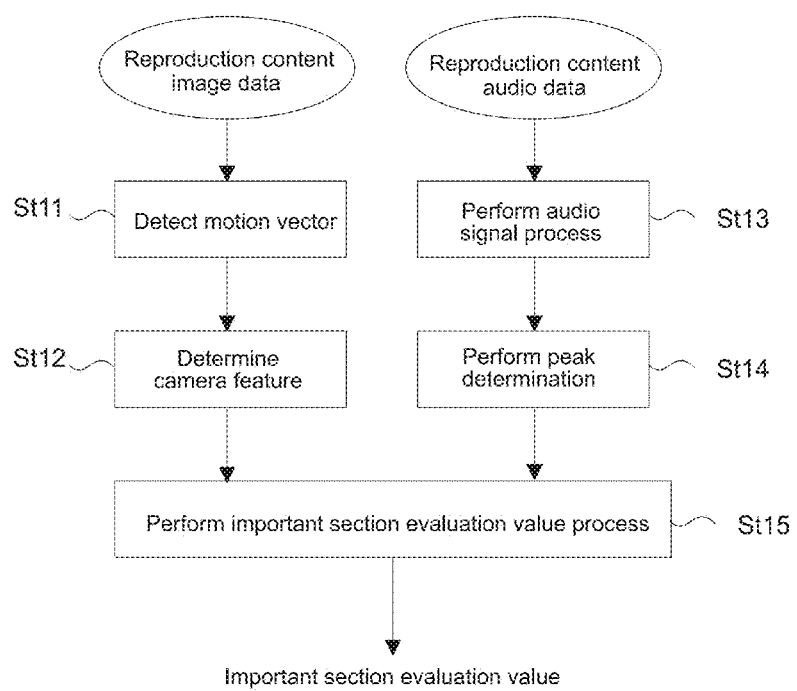
FIG. 6 is a schematic diagram relating to a detection of an important scene by the information processing apparatus.

FIG. 6 is a schematic diagram relating to the detection of the important scene by the content part specification unit 102. As shown in the figure, content part specification unit 102 performs a motion vector detection (St11) with respect to image data of the reproduction content, and can determine a camera motion feature (camera feature) (St12). The camera feature is an operation of the camera, such as pan, tilt, and zoom of the camera when the content is shot, and an affine coefficient can be extracted for each operation.

Further, the content part specification unit 102 performs an audio signal process (St13) for audio data of the reproduction content, and can determine the peak of the audio (St14) on the basis of an average audio level in a predetermined section, an audio power spectrum in a predetermined frequency band detected, or the like.

The content part specification unit 102 calculates an important section evaluation value by using the affine coefficient of the camera feature, which is an image feature amount extracted from the image data of the content and the power spectrum value in the predetermined frequency band, which is the audio feature amount (St 15). The content part specification unit 102 can calculate the important section evaluation value (G) by using the following expression 1.

$$G = k1 \text{ (pan coefficient)} + k2 \text{ (tilt coefficient)} + k3 \text{ (zoom coefficient)} + k4 \text{ (power spectrum value in predetermined frequency band)} \quad \text{(Expression 1)}$$

k1 to k4 are weight coefficients (k1+k2+k3+k4=1).

The content part specification unit 102 uses the important section evaluation value calculated by using the above expression 1 and thus can detect the important scene in the reproduction content to specify the scene as the content part. It should be noted that the detection of the important scene in the reproduction content is disclosed in Japanese Patent Application Laid-open No. 2011-78028, International Publication WO06/016605, Japanese Patent Application Laid-open No. 2007-318200, and the like, and the extraction of the feature amount such as the camera feature and the affine coefficient is disclosed in Japanese Patent Application Laid-open No. 2009-49546 and the like. The content part specification unit 102 can detect the important scene from the reproduction content by various methods.

The present disclosure is not limited to the above embodiments and can be changed without departing from the gist of the present disclosure.

In the above embodiment, the content reproduction unit reproduces a reproduction content selected by the user. At this time, it is possible to reflect the common class extracted by the common class extraction unit on reproducing of the reproduction content. Specifically, the content reproduction unit can present to the user a content part (scene) corresponding to the common class in the reproduction content as a recommended scene. As a result, the user can reproduce only the recommended scene, for example.

It should be noted that the present disclosure can take the following configurations.

(1) An information processing apparatus, including:
a content reproduction unit configured to reproduce a reproduction content;
a content part specification unit configured to specify a plurality of content parts included in the reproduction content;
a clustering unit configured to classify the plurality of content parts into a plurality of clusters;
a class detection unit configured to detect a class from the plurality of content parts included in each of the plurality of clusters;
a common class extraction unit configured to extract a common class common to the plurality of clusters from the classes detected by the class detection unit; and
a content retrieval unit configured to retrieve a content corresponding to the common class.

(2) The information processing apparatus according to Item (1), in which
the content part specification unit specifies the plurality of content parts in response to specification by a user.

(3) The information processing apparatus according to Item (1) or (2), in which
the content part specification unit specifies the plurality of content parts on the basis of a feature amount extracted from the reproduction content.

(4) The information processing apparatus according to any one of Items (1) to (3), in which
the class detection unit performs an ontology process for the plurality of content parts included in each of the plurality of clusters to detect the class from the plurality of content parts.

(5) The information processing apparatus according to any one of Items (1) to (4), in which
the clustering unit classifies the plurality of content parts into the plurality of clusters on the basis of feature amounts detected from the plurality of content parts.

(6) The information processing apparatus according to any one of Items (1) to (5), in which
the content part specification unit specifies the plurality of content parts on the basis of an image feature amount extracted from the reproduction content.

(7) The information processing apparatus according to any one of Items (1) to (6), in which
the content part specification unit specifies the plurality of content parts on the basis of an audio feature amount extracted from the reproduction content.

(8) The information processing apparatus according to any one of Items (1) to (7), in which
the content reproduction unit reflects the common class on reproduction of the reproduction content.

(9) A program causing an information processing apparatus to function as a content reproduction unit configured to reproduce a reproduction content,
a content part specification unit configured to specify a plurality of content parts included in the reproduction content,
a clustering unit configured to classify the plurality of content parts into a plurality of clusters,
a class detection unit configured to detect a class from the plurality of content parts included in each of the plurality of clusters,
a common class extraction unit configured to extract a common class common to the plurality of clusters from the classes detected by the class detection unit, and
a content retrieval unit configured to retrieve a content corresponding to the common class.

(10) An information processing method, including:
reproducing a reproduction content by a content reproduction unit;
specifying a plurality of content parts included in the reproduction content by a content part specification unit;
classifying the plurality of content parts into a plurality of clusters by a clustering unit;
detecting a class from the plurality of content parts included in each of the plurality of clusters by a class detection unit;
extracting a common class common to the plurality of clusters from the classes detected by the class detection unit by a common class extraction unit; and
retrieving a content corresponding to the common class by a content retrieval unit.

The present disclosure contains subject matter related to that disclosed in Japanese Priority Patent Application JP 2012-124314 filed in the Japan Patent Office on May 31, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
circuitry configured to
reproduce a reproduction content;
specify a plurality of content parts included in the reproduction content;
classify the plurality of content parts into a plurality of clusters based on at least one object recognized in each of the plurality of content parts;

detect a plurality of classes, for each of the plurality of clusters by performing an ontology process for the at least one object recognized in each of the plurality of content parts included in each of the plurality of clusters;

extract a plurality of common classes, common to the plurality of clusters, from the plurality of detected classes;

retrieve the plurality of common classes as a plurality of retrieval keywords and retrieve a plurality of content corresponding to the plurality of common classes by searching using the plurality of common classes as retrieval keywords; and present the retrieved plurality of content and the plurality of common classes used as the keywords, wherein the at least one object recognized in each of the plurality of content parts that is used to classify the plurality of content parts into the clusters is a common subject found in each of the content parts, and the common subject used to classify the plurality of content parts into each cluster is used to detect the plurality of the classes for the respective cluster.

2. The information processing apparatus according to claim 1, wherein the circuitry is further configured to specify the plurality of content parts in response to specification by a user.

3. The information processing apparatus according to claim 1, wherein the circuitry is further configured to specify the plurality of content parts on the basis of a feature amount extracted from the reproduction content.

4. The information processing apparatus according to claim 1, wherein the circuitry is further configured to specify the plurality of content parts on the basis of an image feature amount extracted from the reproduction content.

5. The information processing apparatus according to claim 1, wherein the circuitry is further configured to specify the plurality of content parts on the basis of an audio feature amount extracted from the reproduction content.

6. The information processing apparatus according to claim 1, wherein the circuitry is further configured to reflect the plurality of common classes on reproduction of the reproduction content.

7. The information processing apparatus according to claim 1, wherein a class of the plurality of classes corresponds to a concept commonly extracted from the plurality of content parts, wherein the circuitry is configured to detect the class by performing an ontology process for the at least one object recognized in each of the plurality of content parts included in each of the plurality of clusters.

8. A non-transitory computer-readable storage medium having stored thereon, a set of instructions that, when executed by a computer, causes the computer to perform the steps comprising:

reproducing a reproduction content;

specifying a plurality of content parts included in the reproduction content;

classifying the plurality of content parts into a plurality of clusters based on at least one object recognized in each of the plurality of content parts;

detecting a plurality of classes, for each of the plurality of clusters, by performing an ontology process for the at least one object recognized in each of the plurality of content parts included in each of the plurality of clusters;

extracting a plurality of common classes, common to the plurality of clusters, from the detected plurality of classes;

retrieving the plurality of common classes as a plurality of retrieval keywords;

retrieving a plurality of content corresponding to the plurality of common classes by searching using the plurality of common classes as retrieval keywords; and displaying the retrieved plurality of content and the extracted plurality of common classes as the plurality of retrieval keywords, wherein the at least one object recognized in each of the plurality of content parts that is used to classify the plurality of content parts into the clusters is a common subject found in each of the content parts, and the common subject used to classify the plurality of content parts into each cluster is used to detect the plurality of the classes for the respective cluster.

9. An information processing method, comprising:

in an information processing apparatus:

reproducing a reproduction content;

specifying a plurality of content parts included in the reproduction content;

classifying the plurality of content parts into a plurality of clusters based on at least one object recognized in each of the plurality of content parts;

detecting a plurality of classes, for each of the plurality of clusters, by performing an ontology process for the at least one object recognized in each of the plurality of content parts included in each of the plurality of clusters;

extracting a plurality of common classes, common to the plurality of clusters, from the detected plurality of classes;

retrieving the plurality of common classes as a plurality of retrieval keywords;

retrieving a plurality of content corresponding to the plurality of common classes by searching using the plurality of common classes as retrieval keywords; and displaying the retrieved plurality of content and the extracted plurality of common classes as the plurality of retrieval keywords, wherein the at least one object recognized in each of the plurality of content parts that is used to classify the plurality of content parts into the clusters is a common subject found in each of the content parts, and the common subject used to classify the plurality of content parts into each cluster is used to detect the plurality of the classes for the respective cluster.

* * * * *